March 9, 1965     W. L. BORKOWSKI ETAL     3,172,915
PREPARATION OF OXYGENATED METHANE DERIVATIVES
Filed April 13, 1961
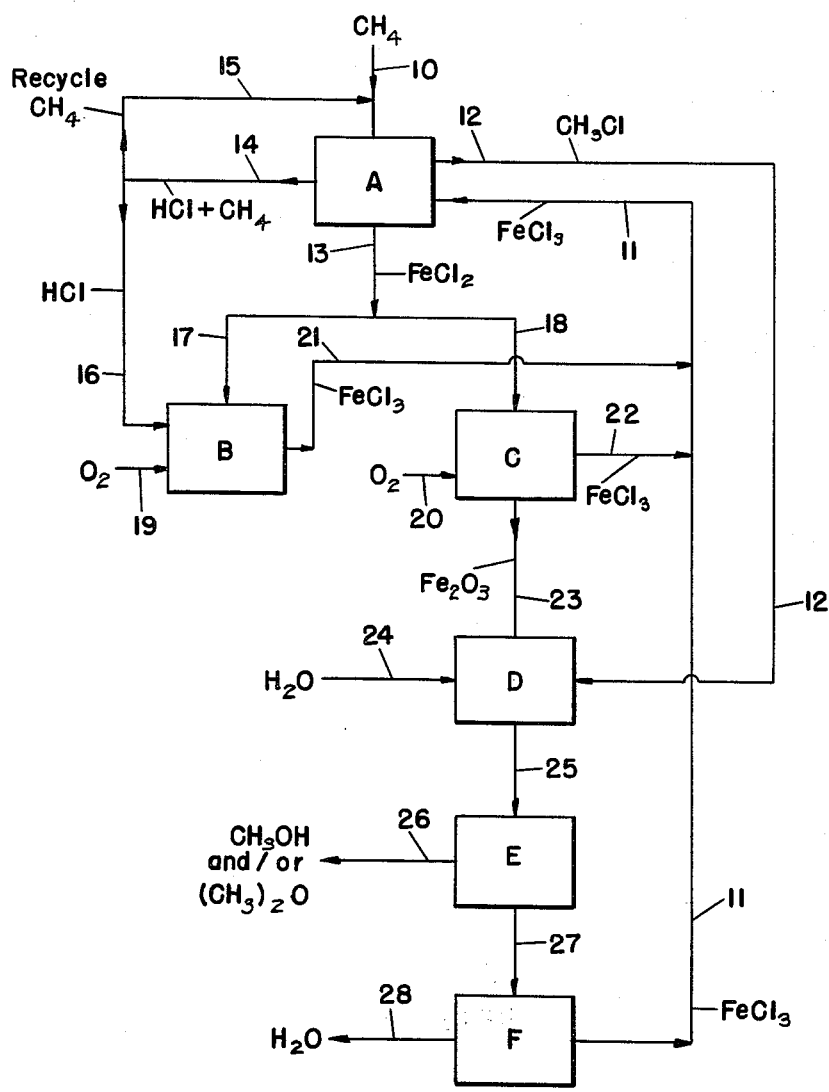
INVENTORS
WALTER L. BORKOWSKI
PAUL E. OBERDORFER, JR.
WALTER H. SEITZER
BY
Robert O. Spindle
ATTORNEY

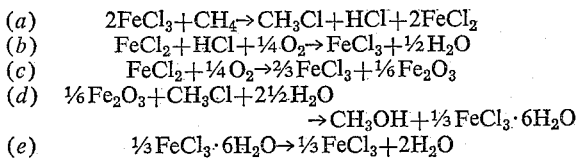

3,172,915
PREPARATION OF OXYGENATED METHANE DERIVATIVES

Walter L. Borkowski, Media, Pa., Paul E. Oberdorfer, Jr., Claymont, Del., and Walter H. Seitzer, Springfield, Pa., assignors to Sun Oil Company, Philadelphia, Pa., a corporation of New Jersey
Filed Apr. 13, 1961, Ser. No. 102,743
16 Claims. (Cl. 260—614)

This invention relates to the preparation of oxygenated derivatives of methane. In a more particular aspect the invention is directed to a process involving a combination of steps whereby methane is converted to methanol, dimethyl ether or both.

In a particular embodiment, the present process involves first the reaction of methane with ferric chloride ($FeCl_3$) under conditions whereby methyl chloride ($CH_3Cl$) is formed and the $FeCl_3$ is converted to $FeCl_2$. The latter is processed in a plurality of steps, as hereinafter fully described, whereby a major part of the $FeCl_2$ is converted back to $FeCl_3$ and the remainder is converted to $Fe_2O_3$. The latter is utilized in a hydrolysis step in which the $CH_3Cl$ is converted to methanol and/or dimethyl ether and the $Fe_2O_3$ is simultaneously converted to hydrated $FeCl_3$. Water is removed from the hydrated $FeCl_3$ and the resulting dry $FeCl_3$ is used along with the $FeCl_3$ recovered from the other steps for further reaction with methane. No net consumption of chlorine occurs in the process and the only materials consumed are the methane and oxygen which can be supplied in the form of air.

The combination process according to one embodiment of the invention involves the following series of steps:

(1) Methane is contacted with $FeCl_3$ at a temperature in the range of 220–800° C., more preferably 250–450° C. This results in the formation of $CH_3Cl$ and HCl and the dechlorination of the iron compound to $FeCl_2$.

(2) The reaction product from step (1) is processed in suitable manner to obtain separately the $CH_3Cl$, HCl and $FeCl_2$. Generally unreacted methane is present in the reaction mixture, and it can be recovered and recycled to step (1).

(3) A portion of the $FeCl_2$ from step (2) is reacted with oxygen (air) together with the HCl recovered from step (2) to form $FeCl_3$ and water. The temperature range for this reaction is 200–500° C. and more preferably 350–475° C.

(4) The remainder of the $FeCl_2$ from step (2) is reacted with oxygen alone to form $FeCl_3$ and $Fe_2O_3$. The temperature range for this step also is 200–500° C. and more preferably 350–475° C.

(5) The $CH_3Cl$ from step (2) is contacted with water in the presence of the $Fe_2O_3$ from step (4) at a temperature in the range of 100–220° C., whereby the $CH_3Cl$ hydrolyzes to $CH_3OH$ and/or $(CH_3)_2O$ and the $Fe_2O_3$ simultaneously is converted to hydrated $FeCl_3$. The addition of the $Fe_2O_3$ to the hydrolysis is important for making the hydrolysis reaction proceed efficaciously and also for recovering the iron and chlorine in the desired form for re-use. Whether $CH_3OH$ or $(CH_3)_2O$ is the predominant hydrolysis product depends upon the reaction temperature used. Temperatures below about 135–140° C. tend to cause the $CH_3OH$ to predominate while temperatures above this level tend to cause $(CH_3)_2O$ to be the major product. For producing $CH_3OH$ a temperature in the range of 120–135° C. is preferred, while a temperature in the range of 140–160° C. is preferred if $(CH_3)_2O$ is the desired product.

(6) The hydrated $FeCl_3$ from the preceding step is dehydrated to recover dry $FeCl_3$.

(7) The $FeCl_3$ recovered from steps (3), (4) and (6) is recycled to step (1) to make the process continuous.

The reactions involved in the process can be depicted by the following equations (assuming methanol to be the desired product):

(a) $2FeCl_3 + CH_4 \rightarrow CH_3Cl + HCl + 2FeCl_2$
(b) $FeCl_2 + HCl + \frac{1}{4}O_2 \rightarrow FeCl_3 + \frac{1}{2}H_2O$
(c) $FeCl_2 + \frac{1}{4}O_2 \rightarrow \frac{2}{3}FeCl_3 + \frac{1}{6}Fe_2O_3$
(d) $\frac{1}{6}Fe_2O_3 + CH_3Cl + 2\frac{1}{2}H_2O$
$\rightarrow CH_3OH + \frac{1}{3}FeCl_3 \cdot 6H_2O$
(e) $\frac{1}{3}FeCl_3 \cdot 6H_2O \rightarrow \frac{1}{3}FeCl_3 + 2H_2O$ From these equations it is apparent that all of the iron and chlorine are recovered as dry $FeCl_3$ which can be repeatedly re-used in the reaction of Equation a. From Equation d it can be seen that the hydrolysis can be carried out using only 2.5 moles of water for each mole of $CH_3Cl$ reacted. Hence the heat requirements or the amounts of drying gas needed in the drying step are minimized. Furthermore the hydrated ferric chloride produced in Equation d can readily be handled in liquid form, since the hexahydrate of $FeCl_3$ has a melting point of only 37° C.

The utility of the hydrolysis step depicted by Equation d is not limited to the specific process herein described. It is applicable to any type of process wherein methane is contacted with $FeCl_3$ at elevated temperature to form a chloromethane and $FeCl_2$ and the $FeCl_2$ is subsequently contacted with oxygen to form $Fe_2O_3$ and wherein the chloromethane is hydrolyzed. For example, the methane reaction can be carried out under conditions to produce methylene chloride ($CH_3Cl_2$) and the latter can be hydrolyzed in the presence of the $Fe_2O_3$ to produce formaldehyde (HCHO). Likewise, the methane reaction can be conducted to produce $CCl_4$ and the latter can be hydrolyzed to produce phosgene ($COCl_2$). In such other cases the presence of the $Fe_2O_3$, formed by the reaction of $FeCl_3$ with $CH_4$ followed by oxidation of the resulting $FeCl_2$, in the hydrolysis step offers the benefit referred to above. In any of these cases it is especially desirable that the $FeCl_3$—$CH_4$ reaction be carried out with the $FeCl_3$ in vapor phase, since the $FeCl_2$ which deposits therefrom is a very finely divided solid and gives an unusual form of $Fe_2O_3$ which is especially effective for promoting the hydrolysis in an efficacious manner. Distinguishing characteristics of $Fe_2O_3$ obtained in this way, as compared to usual forms of $Fe_2O_3$, are that it is readily soluble in dilute hydrochloric acid and tends to be considerably darker and generally black. It is a fluffy, fine powder and probably has a lower bulk density than the usual $Fe_2O_3$. In any event it is highly effective in promoting the hydrolysis of chloromethanes.

The invention is more specifically described in conjunction with the accompanying drawing which is a schematic flowsheet illustrating one embodiment of the process.

With reference to the drawing, Zone A can be referred to as a ferrichlorinator where the reaction depicted by Equation a is effected. Methane is fed into the system and to Zone A through line 10 while $FeCl_3$ is fed thereto via line 11. The temperature in Zone A is maintained in the range of 220–800° C., more preferably 250–450° C., and the $FeCl_3$ can be in solid, liquid or gaseous form. Preferably the temperature is above the boiling point of the $FeCl_3$ so that the latter is in vapor phase. Reaction between the $CH_4$ and $FeCl_3$ occurs with the formation of $CH_3Cl$ and simultaneous reduction of the iron compound to $FeCl_2$. Generally some of the other chloromethanes are formed but the yield of $CH_3Cl$ can be regulated by appropriate adjustment of conditions, particularly the ratio of $FeCl_3$ to $CH_4$. Low $FeCl_3$:$CH_4$ molar ratios give $CH_3Cl$ as the main reaction product, while high ratios favor the formation of more highly chlorinated methanes. For example, in operating at 355° C. and a residence time in Zone A of 1.25 hours, chloromethane proportions at two different FeCl₃:CH₄ molar ratios have been found in the product as follows:

| FeCl₃:CH₄ Ratio | CH₃Cl, percent | CH₂Cl₂, percent | CHCl₃, percent | CCl₄, percent |
| --- | --- | --- | --- | --- |
| 0.34 | 52 | 35 | 13 | |
| 1.90 | 30 | 28 | 27 | 15 |

The practice of such ferrichlorination of methane to produce the several chloromethanes has been described and claimed in Blair application Serial No. 60,423, filed October 4, 1960, and now abandoned.

The reaction product obtained in Zone A is fractionated in any suitable manner to separate the components of the mixture from each other. The FeCl₂, being a powdery solid at the reaction temperature, will readily settle out and the other products can be separated, for example, by fractional distillation. As shown in the drawing, which is merely a schematic illustration, CH₃Cl leaves Zone A through line 12, FeCl₂ through line 13, and a mixture of HCl and unreacted CH₄ via line 14. For sake of simplicity removal of the more highly chlorinated methanes is omitted.

One manner of separating the HCl and CH₄ flowing from line 14 is by selective absorption of the HCl by means of a relatively dilute aqueous HCl solution followed by stripping of HCl from the enriched absorption medium. Such a procedure has been described in Chemical and Engineering Progress, December, 1960, at pages 67–73. Alternatively, any other suitable separation procedure can be used. The recovered HCl is sent through line 16 to Zone B.

A portion of the FeCl₂ from line 13 passes through line 17 to Zone B for reaction according to Equation $b$ and the remainder passes through line 18 to Zone C for reaction as per Equation $c$. From an examination of the equations, it can be seen that about equal amounts of the FeCl₂ should be fed to the two zones, when it is desired to follow the stoichiometric balances presented by the equations. However, the relative amounts fed to the two zones can be varied considerably and, in fact, Zone B can be eliminated entirely as hereinafter more fully described for another embodiment of the process. Into Zones B and C oxygen, which conveniently can be in the form of air, is introduced through lines 19 and 20, respectively, in at least the amounts required to provide the stoichiometric quantities indicated by Equations $b$ and $c$. The temperature in each of these zones should be in the range of 200–500° C. and preferably 350–475° C. From Zones B and C the FeCl₃ formed is removed, respectively, through lines 21 and 22, whence it returns via line 11 to Zone A for re-use.

Zone D is the hydrolyzer wherein the CH₃Cl product from Zone A is converted to methanol and/or dimethyl ether in the presence of Fe₂O₃ obtained from Zone C via line 23. Water enters the hydrolyzer through line 24 and the CH₃Cl is fed thereto from line 12. From Equation $d$ it can be seen that only 2.5 moles of water are required per mole of CH₃Cl introduced. The temperature in Zone D is maintained in the range of 100–220° C. and more preferably 120–160° C. For the production of methanol a temperature in the range of 120–135° C. is preferred, while a temperature in the range of 140–160° C. is preferred for producing dimethyl ether. At 120° C. the product includes only a trace of dimethyl ether, and at 150° C. it is predominantly dimethyl ether but includes a substantial proportion of methanol. The time allowed for the hydrolysis reaction can vary widely dependent upon the temperature used but generally should be in the range of 0.5 hour to 50 hours. Typically 15–20 hours is allowed at 120° C. and 2–3 hours at 150° C.

The reaction mixture which is removed from Zone D through line 25 is composed mainly of CH₃OH and/or (CH₃)₂O and hydrated FeCl₃ in liquid form. It also contains any unreacted CH₃Cl and Fe₂O₃, and it generally also contains a small amount of FeOCl. The mixture is sent to separation Zone E where the CH₃OH and/or (CH₃)₂O are distilled off as indicated by line 26. Any unreacted CH₃Cl also would be removed with these products, and the mixture can be resolved into its individual components by any suitable separation means, as by fractional distillation.

The stream removed from Zone E through line 27 is mainly FeCl₃·6H₂O but may also contain FeOCl and unreacted Fe₂O₃. Since the hydrated FeCl₃ has a melting point of 37° C., it can readily be handled as a liquid and can be pumped to Zone F for drying. Drying can be effected by heating to drive off the water as indicated by line 28 but this procedure is not preferred since FeCl₃ tends to hydrolyze to form basic salts at the elevated temperatures required to remove the water. The preferred procedure comprises passing dry HCl in contact with the material from line 27 in amount sufficient to remove all the water. The temperature for such operation should be above 66° C., since this is the transition temperature at which the anhydrous form of FeCl₃ is the stable form; and a considerably higher temperature can be used, for example, up to 250° C. Such drying by means of HCl can be done conveniently in a countercurrent spray type drier. The use of HCl as the drying agent has the additional advantage that any FeOCl and Fe₂O₃ present in the mixture are converted to FeCl₃. The dried FeCl₃ is recycled through line 11 for re-use in Zone A. The wet HCl from the drying operation can be fractionally distilled to recover dry HCl for re-use.

The above-described process can be modified to eliminate Zone B from the system. In such case all of the FeCl₂ from Zone A would be feed to Zone C wherein two-thirds of the iron would be converted to FeCl₃ and one-third to Fe₂O₃ by the oxygen, as can be seen from Equation $c$. The amount of Fe₂O₃ thus produced would be in excess of that required to remove the chlorine from the CH₃Cl in the hydrolysis step. However, this excess is advantageous in Zone D, as it tends to expedite the reaction and insure complete hydrolysis. In this alternative embodiment of the invention, the HCl produced by the reaction in Zone A preferably would be used in the drying operation in Zone E, in which event the amount of such HCl would be equivalent to the stoichiometric amount required to convert all of the excess Fe₂O₃ back to FeCl₃ for re-use in Zone A. Additionally dry HCl from another source also is required in order to effect the removal of water from the mixture. As in the first-described embodiment, the wet HCl from the drier would be fractionally distilled so that the HCl could be recovered for re-use in the drying operation.

We claim:

1. Combination process which comprises the steps of (1) contacting methane with FeCl₃ at a temperature in the range of 220–800° C.; (2) separating from the reaction mixture CH₃Cl, HCl and FeCl₂; (3) contacting a portion of the FeCl₂ with HCl from step (2) and oxygen at a temperature in the range of 200° to 500° C. to form FeCl₃ and water; (4) contacting the remainder of FeCl₂ from step (2) with oxygen at a temperature in the range of 200° to 500° C. to form FeCl₃ and Fe₂O₃; (5) contacting the CH₃Cl from step (2) with water in the presence of the Fe₂O₃ from step (4) at a temperature in the range of 100° to 220° C., whereby the CH₃Cl hydrolyzes to oxygenated hydrocarbon selected from the group consisting of methanol and dimethyl ether and the Fe₂O₃ is converted to hydrated ferric chloride; (6) recovering said oxygenated hydrocarbon from the reaction mixture of step (5); (7) dehydrating said hydrated ferric chloride to obtain FeCl₃; and (8) recycling the FeCl₃ from steps (3), (4) and (7) to step (1) for re-use.

2. Process according to claim 1 wherein the temperature in step (5) is in the range of 120–135° C. and said oxygenated hydrocarbon is principally methanol.

3. Process according to claim 1 wherein the temperature in step (5) is in the range of 140–160° C. and said oxygenated hydrocarbon is principally dimethyl ether.

4. Process according to claim 1 wherein the temperature in step (1) is in the range of 250–450° C.

5. Process according to claim 1 wherein the temperature in step (1) is above the boiling point of $FeCl_3$ and the methane is reacted with the $FeCl_3$ in vapor phase.

6. In a process wherein methane is contacted with $FeCl_3$ at elevated temperature to form a chloromethane and $FeCl_2$, and $FeCl_2$ is subsequently contacted with oxygen to form $Fe_2O_3$; the steps which comprise contacting the chloromethane with water in the presence of the $Fe_2O_3$ at a temperature in the range of 100–220° C. whereby the chloromethane hydrolyzes to an oxygenated carbon compound and the $Fe_2O_3$ is converted to hydrated $FeCl_3$, separating said oxygenated carbon compound from the hydrated $FeCl_3$, and dehydrating the hydrated $FeCl_3$ to obtain dry $FeCl_3$ for re-use in the reaction with methane.

7. Process according to claim 6 wherein the chloromethane is $CH_3Cl$ and the temperature in the hydrolysis step is in the range of 120–135° C. and said oxygenated carbon compound is principally methanol.

8. Process according to claim 6 wherein the chloromethane is $CH_3Cl$ and the temperature in the hydrolysis step is in the range of 140–160° C. and said oxygenated carbon compound is principally dimethyl ether.

9. Process according to claim 6 wherein the $FeCl_2$ is formed by reaction between methane and $FeCl_3$ in vapor phase.

10. Combination process which comprises the steps of (1) contacting methane with $FeCl_3$ at a temperature in the range of 220–800° C.; (2) separating from the reaction mixture $CH_3Cl$, HCl and $FeCl_2$; (3) contacting the $FeCl_2$ from step (2) with oxygen at a temperature in the range of 200° to 500° C. to form $FeCl_3$ and $Fe_2O_3$; (4) contacting the $CH_3Cl$ from step (2) with water in the presence of the $Fe_2O_3$ from step (3) at a temperature in the range of 100° to 220° C., whereby the $CH_3Cl$ hydrolyzes to oxygenated hydrocarbon selected from the group consisting of methanol and dimethyl ether and a portion of the $Fe_2O_3$ is converted to hydrated ferric chloride; (5) recovering said oxygenated hydrocarbon from the reaction mixture of step (4); (6) passing the HCl from step (2) together with additional HCl in contact with the mixture of $Fe_2O_3$ and hydrated ferric chloride from step (4), whereby the $Fe_2O_3$ is converted to $FeCl_3$ and the hydrated ferric chloride is dehydrated; and (7) recycling the $FeCl_3$ from steps (3) and (6) to step (1) for re-use.

11. Process according to claim 10 wherein the temperature in step (4) is in the range of 120–135° C. and said oxygenated hydrocarbon is principally methanol.

12. Process according to claim 10 wherein the temperature in step (4) is in the range of 140–160° C. and said oxygenated hydrocarbon is principally dimethyl ether.

13. Process according to claim 10 wherein the temperature in step (1) is in the range of 250–450° C.

14. Process according to claim 10 wherein the temperature in step (1) is above the boiling point of $FeCl_3$ and the methane is reacted with the $FeCl_3$ in vapor phase.

15. Method of hydrolyzing a chloromethane which comprises contacting the chloromethane with water in the presence of $Fe_2O_3$ at a temperature in the range of 100–220° C. whereby the chloromethane hydrolyzes to an oxygenated carbon compound and the $Fe_2O_3$ is converted to hydroated $FeCl_3$, said $Fe_2O_3$ having been obtained by contacting methane with $FeCl_3$ to form chloromethane and $FeCl_2$ and by contacting the so-formed $FeCl_2$ with oxygen.

16. Process according to claim 15 wherein the $FeCl_2$ is formed by reaction between methane and $FeCl_3$ in vapor phase.

References Cited in the file of this patent

UNITED STATES PATENTS

| 2,677,598 | Crummett et al. | May 4, 1954 |
| 2,752,223 | Reeve | June 26, 1956 |
| 2,852,339 | Hill | Sept. 16, 1958 |

FOREIGN PATENTS

| 29,964 of 1912 | Great Britain | Mar. 2, 1914 |
| 214,293 | Great Britain | Apr. 14, 1924 |
| 701,797 | Great Britain | Jan. 6, 1954 |

OTHER REFERENCES

Mellor: Comprehensive Treatise on Inorganic and Theoretical Chemistry, vol. 14 (1935), page 20.

Remy: Treatise on Inorganic Chemistry, vol. II (1956), page 282, QD 15 1R45.